United States Patent [19]

Jarrett et al.

[11] 4,144,147

[45] Mar. 13, 1979

[54] PHOTOLYSIS OF WATER USING RHODATE SEMICONDUCTIVE ELECTRODES

[75] Inventors: Howard S. Jarrett, Wilmington, Del.; Harold H. C. Kung, Glenview, Ill.; Arthur W. Sleight, Kennett Square, Pa.

[73] Assignee: E. I. Du Pont de Nemours and Company, Wilmington, Del.

[21] Appl. No.: 836,839

[22] Filed: Sep. 26, 1977

[51] Int. Cl.$^2$ .................. C25B 1/04; H01M 6/30
[52] U.S. Cl. ........................ 204/129; 204/266; 204/278; 204/291; 204/DIG. 3; 429/111; 252/62.3 V; 252/62.3 BT
[58] Field of Search ........... 204/129, 266, 278, 290 R, 204/290 F, 291-293; 429/111; 252/62.3 V, 62.3 BT, 501, 521; 250/527; 423/592, 593

[56] References Cited

U.S. PATENT DOCUMENTS

| 3,616,446 | 10/1971 | DeWitt | 204/290 F |
|---|---|---|---|
| 3,632,498 | 1/1972 | Beer | 204/290 F |
| 3,644,147 | 2/1972 | Young | 136/86 D |
| 3,663,414 | 5/1972 | Martinsons et al. | 204/290 F |
| 3,925,212 | 12/1975 | Tchernev | 250/527 |
| 4,011,149 | 3/1977 | Nozik | 204/129 |
| 4,042,758 | 8/1977 | Weinstein et al. | 429/111 |

FOREIGN PATENT DOCUMENTS 1147442  4/1969  United Kingdom ............... 204/290 F

OTHER PUBLICATIONS

D. T. Sawyer et al., "Experimental Electrochemistry for Chemists", Wiley (1974), pp. 34-47.
H. Yoneyama et al., "A Photo-Electrochemical Cell with Production of Hydrogen & Oxygen by a Cell Reaction", *Electrochimica Acta*, vol. 20, pp. 341-345 (1975).
A. J. Nozik, "p-n Photoelectrolysis Cells", *Appl. Phys. Lett.*, vol. 29, pp. 150-153 (1976).
R. Memming, "Electrochemical Properties of Gallium Phosphide in Aqueous Solutions", *Electrochimica Acta*, vol. 13, pp. 1299-1310 (1968).
J. L. Fox, "Rhodium Complex Splits Water Using Sunlight", *Chem. and Eng. News*, Aug. 1, 1977, pp. 15-16.
A. Fujishima et al., "Electrochemical Photolysis of Water at a Semiconductor Electrode", *Nature*, vol. 238, pp. 37-38 (1972).
A. J. Nozik, "Electrode Materials for Photoelectrochemical Devices", *J. Crystal Growth*, vol. 39, pp. 200-209 (1977).
H. H. Kung et al., "Semiconducting Oxide Anodes in Photoassisted Electrolysis of Water", *J. Apply. Phys.*, vol. 48, pp. 2463-2469 (1977).

*Primary Examiner*—John H. Mack
*Assistant Examiner*—Aaron Weisstuch

[57] ABSTRACT

Decomposition of water into hydrogen and oxygen by sunlight is accomplished by using a rhodate p-type semiconductor as cathode and an n-type semiconductor or a metal as anode. A cell exposed to sunlight using a rhodate cathode and an n-type $TiO_2$ anode decomposes the contained water and also generates electric power.

25 Claims, 3 Drawing Figures

PHOTOLYSIS OF WATER USING RHODATE SEMICONDUCTIVE ELECTRODES

BACKGROUND OF THE INVENTION

1. Field of the Invention

This invention relates to the photolysis of water using a p-type semiconductor cathode comprising a rhodate and an anode comprising an n-type semiconductor or a metal conductor. When n-type $TiO_2$ is used as the anode solar radiation not only decomposes the water into oxygen and hydrogen but also produces an electrical current.

2. Prior Art

The photoelectrolysis of water was first observed by Hondo and Fujishima, Nature 238, 37 (July 7, 1972). When an n-type semiconductor, used as an anode in an electrolytic cell containing an aqueous electrolyte, is irradiated with greater than band-gap light, the applied potential required to electrolyze water is reduced. Such photoassisted electrolysis has been the subject of much recent work. Hondo and Fujishima suggested that a more effective reduction of the applied potential might arise in a cell containing both an n-type anode and a p-type cathode.

U.S. Pat. No. 4,011,149 to Nozik discloses thin-film electrodes one of which can be a p-type semiconductor and the other an n-type semiconductor.

U.S. Pat. No. 3,925,212 to D. I. Tchernev discloses a system which utilizes an n-type semiconductor such as $TiO_2$ and a p-type semiconductor such as GaP. H. Yoneyama et al., Electrochim. Acta. 20, 341 (1975) disclose a similar system and observe that deterioration of the cell performance occurs, mainly due to the instability of the p-GaP electrode. A. J. Nozik, Applied Physics Letters 29 No. 3, 150 (Aug. 1, 1976) likewise discusses a system utilizing an n-type semiconductor such as $TiO_2$ and a p-type semiconductor such as GaP and gives an energy analysis of such a system. None of these systems are very stable, and in fact GaP has been the subject of much research on its dissolution in alkaline and acid solution [R. Memming and G. Schwandt, Electrochimica Acta 13, 1299 (1968)].

U.S. Pat. No. 3,632,498 to Beer discloses an electrode part of whose surface may comprise rhodium oxide. The patent makes no mention of the properties of such rhodium oxide and has no teaching of a p-type semiconducting trivalent oxide. Further, no disclosure is made of any solar cell in using a p-type trivalent rhodium oxide as cathode.

U.S. Pat. No. 3,644,147 to Young discloses a number of mixed valency transition metal perovskites as cathodes for fuel cells or electrolytic cells wherein electrical energy is supplied from an external source (Col. 1, lines 44-45). The nature of the perovskites as to whether they are n-type or p-type, etc., is not mentioned. And again no mention is made of a solar cell using a p-type trivalent rhodium oxide as cathode.

DESCRIPTION OF THE INVENTION

It has now been discovered that a much more electrochemically stable cathode can be made from a p-type semiconducting rhodate.

The invention includes a p-type semiconducting electrode comprising an oxide of trivalent rhodium.

The invention also includes a photoelectrochemical cell comprising an anode and a p-type semiconducting cathode wherein the said cathode comprises an oxide of trivalent rhodium.

The invention further includes a sunlight-permeable device for decomposing water into hydrogen and oxygen when filled with a sunlight-permeable aqueous electrolyte and exposed to sunlight comprising a container permeable to sunlight
having within it an anode and a cathode so spaced that entering sunlight will impinge on both simultaneously,
the anode being a metallic conductor or an n-type semiconductor, the cathode being a p-type semiconducting oxide of trivalent rhodium having a resistivity less than $10^5$ ohm-cm, and an external electrical circuit connecting the anode and cathode, the said circuit containing an applied voltage of zero to 1.23 volts.

The p-type rhodates used in this invention have a resistivity of less than $10^5$ ohm-cm and advantageously have optical band gaps in the range of the solar spectrum. They are stable in aqueous electrolytes and are not detectably reduced by hydrogen at room temperature. They also generate a photovoltage with a polarity that reduces the applied voltage required for electrolysis of water. In addition to their stability and their band gaps in the visible region, the p-type rhodates, unlike many other transition metal oxide semiconductors such as $TiO_2$, $KTaO_3$, $SrTiO_3$, etc., possess a valence band mainly of metal-like character instead of oxygen p character. This is apparently provided by rhodium in an octohedral environment having an electronic structure of $3d^6$. This latter characteristic provides hole mobility greater than 0.1 $cm^2$/V-sec. which is advantageous for a good p-type semiconducting cathode.

Suitable p-type semiconducting rhodates have the formula $Rh_2O_3$ or $ARhO_3$ where A is a trivalent rare earth. Examples of p-type semiconducting rhodates include $Rh_2O_3$, $LuRhO_3$, $DyRhO_3$, $LaRhO_3$, $YRhO_3$, $GdRhO_3$, and $CaRh_2O_4$. $Rh_2O_3$ should not contain any free rhodium metal.

Preferred for their activity are p-$Rh_2O_3$, p-$LaRhO_3$, p-$DyRhO_3$, and p-$LuRhO_3$, the latter being most preferred.

The anode in this invention can be either an n-type semiconductor or a metallic conductor. The n-type semiconductor is preferred, particularly if it can generate with solar radiation photovoltage which is additive to that generated at the rhodate cathode. When the sum of the photovoltages is greater than 1.23 V, such as in the case using n-$TiO_2$ and p-$LuRhO_3$, electrical power and electrolysis of water are obtained simultaneously without any applied voltage.

The aqueous electrolyte may have any pH. Examples of suitable aqueous electrolytes include 0.2 M NaOH, 0.5 M $Na_2CO_3$, 0.5 M KCl, 0.5 M $Na_2SO_4$, HCl, etc., etc.

n-Type semiconducting anodes are known in the art and include, for example n-$TiO_2$, n-$SrTiO_3$, n-$WO_3$, n-$Fe_2O_3$ and the like. Preferred anodes are those whose anodic photopotential is more cathodic than −0.3 V measured against a saturated calomel electrode.

Metallic conductors, especially those which are electrochemically stable, include platinum, gold, silver, nickel, copper and the like.

The p-type semiconducting rhodates can be prepared by heating under pressure in a vacuum or in air, an intimate mixture of the appropriate oxides or their precursors, which generally should be of high purity. Semiconductor grade materials are preferred since undue amount of impurities adversely affect the photovoltaic properties of the rhodate. Metal impurities, with the exception of the rare earth metals, are particularly to be avoided since they tend to alter the valency of the rhodium. The heating can range from about 1100° C. to about 1400° C. and the pressure can range from about 3000 to 60,000 atmospheres. The time of heating can range from about 4 to about 15 hours. These conditions can be varied as desired so long as the rhodate has sufficient cohesiveness to be capable of being formed and of sufficiently high density to be significantly impermeable to aqueous electrolytes.

Figure 1:
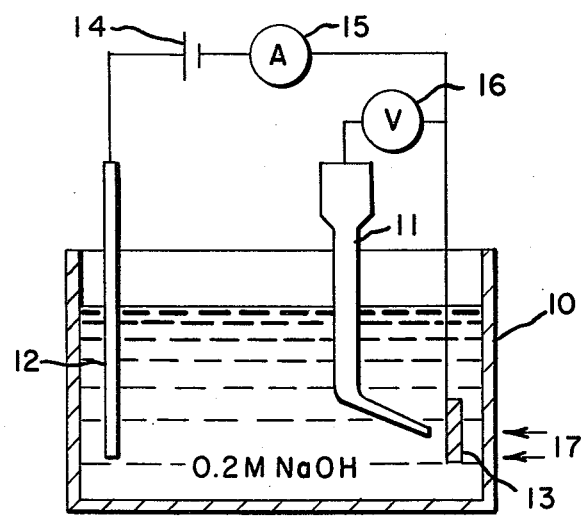
FIG. 1 is a diagramatic view of an apparatus for obtaining the current-voltage characteristics of a p-type semiconductor electrode as measured against a standard saturated calomel electrode.

In FIG. 1, the numeral 10 indicates a quartz vessel containing electrolyte, a saturated calomel electrode 11, a second electrode 12 of platinum, and a third electrode 13 such as p-LuRhO$_3$ whose current-voltage characteristics are to be determined. A power supply is indicated by 14; an ammeter by 15; and a voltmeter by 16. Radiation rays are indicated by the numeral 17. When the radiation strikes the electrode 13, the presence of any generated current and voltage is registered on the ammeter and voltmeter.

Figure 3:
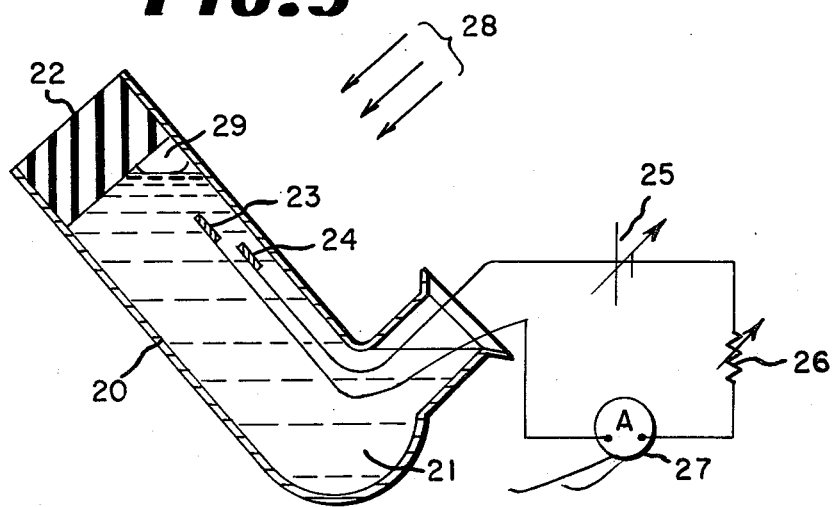
FIG. 3 is a photoelectrolysis cell in which water can be photoelectrolysed.

In FIG. 3 the numeral 20 indicates a quartz container containing 0.5 M sodium hydroxide as electrolyte 21. A rubber stopper 22 caps the container. Cathode 23 is a p-type semiconductor and anode 24 is an n-type semiconductor or a metallic conductor. 25 represents a power supply, 26 a resistor and 27 a Simpson Model 202 volt-ohm-ammeter. Solar radiation 28 which impinges on the two electrodes generates an electric current and decomposes the water into gases which collect in area 29.

SPECIFIC EMBODIMENTS OF THE INVENTION

In the following illustrative examples all parts and percentages are by weight and all temperatures are Centigrade.

EXAMPLE 1

A. Preparation of p-type rhodate electrode — LuRhO$_3$ p-Type LuRhO$_3$ was prepared by thoroughly mixing 1.1317 gm of Lu$_2$O$_3$ and 1.1683 gm of Rh$_2$O$_3$ (1:1 Lu$_2$O$_3$ to Rh$_2$O$_3$) using an agate mortar and pestle. The mixture was sealed in a ⅜" × 5" platinum tube under vacuum, and was then heated at 1350° C. for 10 hr at 3000 atm. The resulting compact was approximately 4 × 3 × 0.5 mm in size and had a resistivity of about 5 ohm-cm at room temperature as determined by a four-people measurement, an activation energy of resistivity of about 0.2 eV, and a thermoelectric power of 75 μV/° C. The compound showed an X-ray pattern of essentially perovskite LuRhO$_3$ with one minor phase of Lu$_2$O$_3$ and one unidentified phase. A composite electrode was made by joining three compacts of the dimensions stated above and attaching a copper wire to indium evaporated onto one side of the composite compact. The wire and the indium were then covered with insulating epoxy resin. B. Photolysis of water The electrochemical behavior of this electrode was tested in a cell shown in FIG. 1 Illumination was provided by a Bausch and Lomb 100W Xe lamp. A Corning glass sharp cut-off filter type 0–52, which removes light of wavelengths shorter than 350 nm, was placed in the light path in front of the light source. In this manner, the illumination spectrum approximates rather closely the solar spectrum in the UV and visible regions. The power supply, ammeter and voltmeter were all integrated in the PAR model 173 potentiostat, which was used with the PAR model 175 universal programmer (Princeton Applied Research Corp., Princeton, N.J.). The electrolyte was 0.2 M NaOH with a pH of 13.3, and the electrodes were p-LuRhO$_3$ (as prepared above), Pt foil and a saturated calomel electrode (SCE) as reference.

The current-voltage characteristics of the p-LuRhO$_3$ were measured against SCE. Without illumination, the behavior of LuRhO$_3$ is like that of a metallic electrode, as for example Pt. On illumination, however, cathodic photocurrent was observed at voltages more cathodic than −0.3 to −0.4 V (vs SCE) and was accompanied by gas evolution which was shown to be H$_2$. Since the thermodynamic potential for evolution of H$_2$ at this pH of 13.3 is −1.0 V (vs SCE), an illuminated p-LuRhO$_3$ can generate H$_2$ at a potential that is reduced by as much as 0.6 to 0.7 V. This amount of reduction is potential equals the maximum photovoltage that can be generated on p-LuRhO$_3$ under these conditions. The p-type semiconducting luRhO$_3$ cathode can therefore convert light energy into chemical energy by reducing, on illumination, the required voltage for electrolysis of water.

Since the incident light did not contain wavelength shorter than 350 nm, p-LuRhO$_3$ is capable of utilizing visible light and can be used for solar energy conversion. Measurement with monochromatic light supplied by a Bausch and Lomb 100W Xe lamp with a Bausch and Lomb 33-86-02 monochromator showed that the optical band gap of LuRhO$_3$ is about 2.2 eV.

Figure 2:
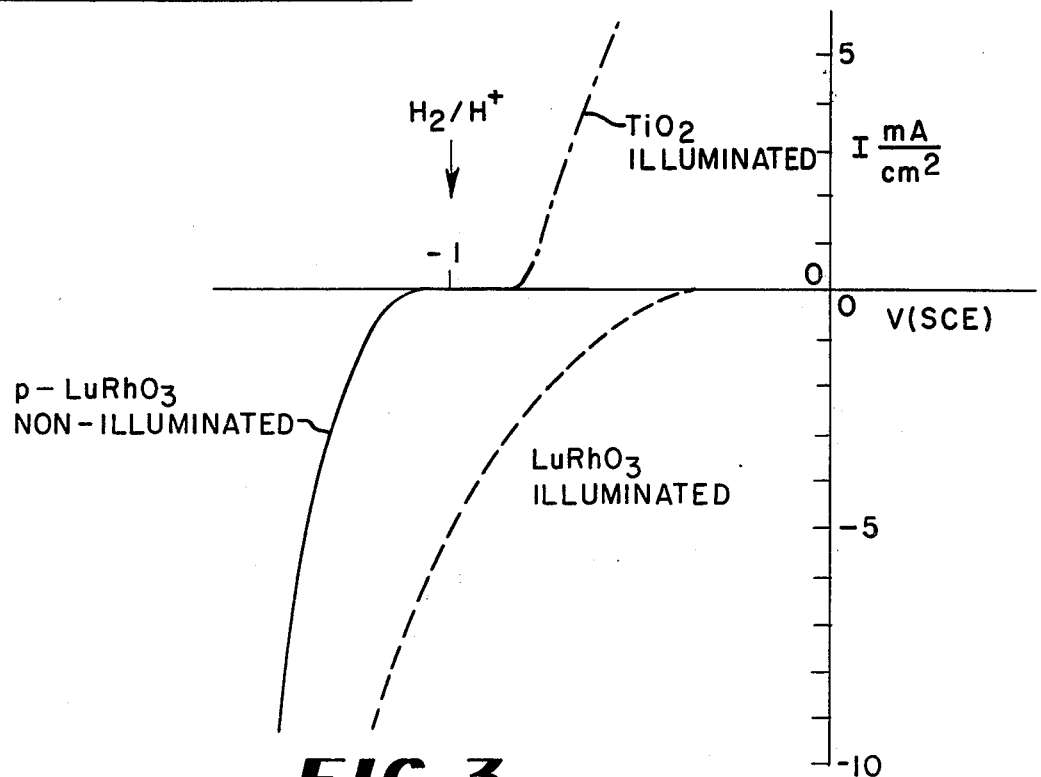
FIG. 2 is a graph of the current-voltage characteristics of p-LuRhO$_3$ as obtained in the apparatus of FIG. 1 for aqueous electrolyte solution containing 0.2 M NaOH.

Electrolysis of water can be powered by light without applied voltage if a p-LuRhO$_3$ cathode is used with an n-type semiconducting anode which can evolve O$_2$ at potentials more cathodic than −0.3 to −0.4 V (vs SCE) in the same electrolyte. Thus if a p-LuRhO$_3$ cathode is used with a stable n-semiconducting anode, then photovoltage of at least 0.6 to 0.7 V with a polarity additive to that generated by p-LuRhO$_3$ can be generated. n-TiO$_2$ as illustrated in the current voltage curve of FIG. 2, shows photocurrent at voltages more anodic than −0.8V due to oxidation of water. Thus when n-TiO$_2$ and p-LuRhO$_3$ are used together, water can be decomposed without applied voltage. Since sunlight contains light of energy larger than the band gaps of TiO$_2$ (3 eV) and p-LuRhO$_3$, solar radiation can be used as the light source.

The electrochemical properites of the LuRhO$_3$ electrode are those of LuRhO$_3$ and not of the minor phases present. The LuRhO$_3$ pellet used in Example 2 below, containing the same unidentified minor phase and a Lu$_2$O$_3$ minor phase, was treated in warm 1 M HNO$_3$ for 2 to 4 days and the dissolved minor Lu$_2$O$_3$ phase was removed. The resulting pellet showed a current-voltage curve very similar to that in FIG. 2 when tested under the same conditions.

A sample that showed an X-ray pattern of only LuRhO$_3$ with no evidence of impurities was prepared by heating a uniform mixture of 0.6128 gm Lu$_2$O$_3$, 0.3713 gm of Rh$_2$O$_3$ and 0.0158 gm Rh metal (20 Lu$_2$O$_3$/19 Rh$_2$O$_3$/2Rh) at 1300° C. under 58 Kbar pressure for 4 hours. This sample showed a resistivity of $3.5 \times 10^3$ ohm-cm at room temperature, an activation energy of resistivity of 0.23 eV, and a thermoelectric power of +900 μV/° C. An electrode made from the sample showed a current-voltage curve similar to that in FIG. 2 under the same conditions except for a lower magnitude of photocurrent due to the high resistance.

EXAMPLE 2

A. Preparation of p-type rhodate electrode — p-LuRhO$_3$ p-LuRhO$_3$ cathode was prepared from part of a compact made by heating, at 1350° C. for 15 hr under 3000 atm pressure, a uniform mixture of 1.8317 gm Lu$_2$O$_3$ and 1.1683 gm Rh$_2$O$_3$ (1:1 Lu$_2$O$_3$ to Rh$_2$O$_3$) in a platinum tube sealed under vacuum. Electrical contact was made by attaching with silver paste a copper wire onto one side of the compact. The silver paste and the copper wire were then covered with an insulating epoxy resin. The compact showed an X-ray pattern of mainly LuRhO$_3$ with one minor Lu$_2$O$_3$ phase and one unidentified minor phase. At room temperature, it had a resistivity of 26 ohm-cm, thermoelectric power of +500 μV/° C., and an activation energy of resistivity of 0.18eV.

B. Preparation of n-type electrode — n-TiO$_2$

The anode was a single crystal slab of rutile TiO$_2$ that was made semiconducting by heating at 970° C. for 16 hr in an atmosphere of CO/CO$_2$ (1:20 volume ratio). The electrode was made by attaching a copper wire to indium evaporated onto one surface of the slab. The indium and the copper wire were covered with insulting epoxy resin.

C. Photolysis of water (1) A cell as depicted in FIG. 3 was fitted with the above electrodes and 0.2 M NaOH was used as the electrolyte. The exposed area was about 0.24 cm$^2$ for LuRhO$_3$, and 0.21 cm$^2$ for TiO$_2$.

For this experiment, the power supply was removed and the resistor was shorted. The Simpson meter was used either in the ammeter mode to measure the short-circuit current or the voltmeter mode to measure the open-circuit voltage. The electrodes were placed near the focal point of a focusing lens 6 inches in diameter. Before reaching the electrodes, the focused solar radiation passed through a quartz vessel containing water which remove the infrared portion of the solar radiation to prevent excessive heating of the electrolyte.

With both electrodes illuminated by sunlight, a current of up to 0.4 mA was obtained. The magnitude of current was found to increase with increasing intensity of radiation. When illumination onto TiO$_2$ onto both electrodes was blocked, current dropped to less than 10 μA; when illumination onto LuRhO$_3$ was blocked, current dropped to less than 30 μA. The residual current may be due to scattered light entering from the side of the vessel. The direction of current flow in the external circuit was from LuRhO$_3$ to TiO$_2$. With sunlight illumination, the open-circuit voltage was about 500 mV.

(2) A further test with the same electrodes showed that short-circuit current of up to 0.54 μA (or 2.5 mA/cm$^2$ based on TiO$_2$ area) and open-circuit voltage of 590 mV can be obtained.

Alternatively, a load resistor can be installed as shown in FIG. 3. Then electrical power can be extracted from the electrolysis cell and the entire assembly is thus powered by sunlight.

With illumination and the cell running under short-circuit conditions, gas was observed to evolve continuously from both the cathode and from the n-TiO2. The gas was collected in the vessel as shown in FIG. 3. In another identical run, the gas was analyzed to contain mostly H$_2$ and air which was introduced during sampling and storing before analysis in the sampling syringe.

The cell reaction is:

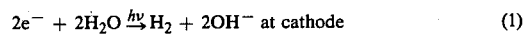

$$2e^- + 2H_2O \xrightarrow{h\nu} H_2 + 2OH^- \text{ at cathode} \tag{1}$$

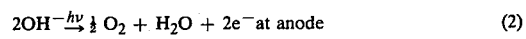

$$2OH^- \xrightarrow{h\nu} \tfrac{1}{2} O_2 + H_2O + 2e^- \text{ at anode} \tag{2}$$

and the overall reaction is

$$H_2O \rightarrow H_2 + \tfrac{1}{2} O_2 \tag{3}$$

This system is superior to the known system of p-GaP-n-TiO$_2$ in its stability. A cell of the instant invention where the cathode was p-LuRhO$_3$ and the anode was n-TiO$_2$ has been run continuously for over 10 hours without deterioration in its performance. It has also been run at intermittent intervals over the course of a year, the accumulated running time being well over 25 hours.

EXAMPLE 3 p-LuRhO$_3$ — Pt Solar cell

Since illuminated p-LuRhO$_3$ evolves H$_2$ at a potential more anodic than the thermodynamic potential, and H$_2$ can be oxidized at a platinum anode at close to the thermodynamic potential, it is possible to construct a solar cell that converts light energy into electrical energy, using H$_2$ and OH$^-$ (or the corresponding species in acid) as the redox couple.

A demonstration cell such as that shown in FIG. 3 was used. The cathode was p-LuRhO$_3$, the same as that used in Example 2. The anode, however, was a piece of Pt gauze. The cell was only half-filled with a 0.2 M NaOH electrolyte that was well purged of O$_2$ but saturated with H$_2$. The Pt gauze was placed such that it was partly submerged in the electrolyte and partly exposed to the trapped H$_2$ gas. The p-LuRhO$_3$, however, was fully submerged. The cell was tested without a power supply or load resistor.

Without solar illumination, there was no voltage between the electrodes and no current flow. On illumination with concentrated sunlight, a short-circuit current of 0.7 μA (2.9 mA/cm$^2$) and an open-circuit voltage of about 0.6 V were obtained. The current flowed from LuRhO$_3$ to Pt through the external circuit. Its magnitude depended on the light intensity. Evolution of gas from LuRhO$_3$ was observed when current was flowing.

The cell reactions are as follows:

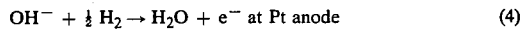

$$OH^- + \tfrac{1}{2} H_2 \rightarrow H_2O + e^- \text{ at Pt anode} \tag{4}$$

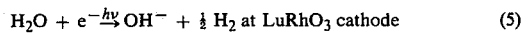

$$H_2O + e^- \xrightarrow{h\nu} OH^- + \tfrac{1}{2} H_2 \text{ at LuRhO}_3 \text{ cathode} \tag{5}$$

Thus there is no net reaction occurring in the cell, but net conversion of light energy into electrical energy. Since the band gap of p-LuRhO$_3$ is about 2.2 eV, solar radiation can be used and the cell is a true solar cell.

Also since H$_2$ is consumed at Pt, and is regenerated at LuRhO$_3$, the cell can be used to purify H$_2$. H$_2$ in the mixture is selectively oxidized at the Pt anode and is regenerated as pure hydrogen at the LuRhO$_3$ cathode. The purification cell can be powered by sunlight.

EXAMPLE 4

LuRhO$_3$ — Ni Cell

From the current-voltage characteristics of LuRhO$_3$ it was concluded that in using an illuminated LuRhO$_3$ cathode, the voltage for reduction of water to hydrogen can be reduced by up to 0.6 or 0.7 V. Electrolysis of water can be achieved by two metallic electrodes, for example, a Pt cathode and a Ni anode, with an applied voltage of more than 1.23 V. Substitution of p-LuRhO$_3$ for the metallic cathode should result in a reduction of the applied voltage by 0.6 to 0.7 V.

A cell, the same as that shown in FIG. 3, was used with nickel as the anode and p-LuRhO$_3$ as the cathode. The positive terminal of a power supply was connected to the Ni anode and the negative terminal to p-LuRhO$_3$ which was the same as that used in Example 2. The resistor was shorted out. Solar radiation concentrated by the focusing lens was the illumination. Electrolyte was 0.2 M NaOH.

With illumination, current began to flow when the applied voltage was larger than about 0.6 V. The current was about 80 $\mu$A (0.33 mA/cm$^2$) at 1.0 V applied, and 120 $\mu$A (0.50 mA/cm$^2$) at 1.1 V applied. Again, gas evolution from LuRhO$_3$ was observed. The cell reactions are represented by equations (1) and (2) with (3) being the net reaction.

Since application of voltages of less than 1.23 V represents net conversion of light energy, use of p-LuRhO$_3$ cathode with an anode that has low overvoltage for O$_2$ evolution results in a system that converts and stores light energy as H$_2$ from H$_2$O.

EXAMPLE 5

DyRhO$_3$ — TiO$_2$ Cell

A p-DyRhO$_3$ electrode can also be used in place of LuRhO$_3$. This was demonstrated with a cell identical to that used in FIG. 3 but without power supply or load resistance. 0.2 M NaOH was used as electrolyte.

p-DyRhO$_3$ electrode was prepared from a pellet prepared by heating, in a Pt container at 1300° C. for 4 hr under 58 Kbar pressure, a uniform mixture of 0.5951 gm Dy$_2$O$_3$ and 0.4049 gm Rh$_2$O$_3$ (1:1 Dy$_2$O$_3$ to Rh$_2$O$_3$). The pellet showed an X-ray pattern of only perovskite DyRhO$_3$. At room temperature, it had a resistivity of 2 × 10$^2$ ohm-cm, thermoelectric power of about +500 $\mu$V/° C., and an activation energy of resistivity of 0.14 eV. A copper wire was attached to the pellet by silver paste. The wire and the paste were then covered with insulating epoxy resin.

On illumination with concentrated sunlight onto both the DyRhO$_3$ cathode and the n-TiO$_2$ anode, an open cell voltage of 46 mV, and a short-circuit current of 30 $\mu$A (0.23 mA/cm$^2$ of DyRhO$_3$) were obtained. The current flow was from DyRhO$_3$ through the external circuit to TiO$_2$. It is apparent that the cell reactions are the same as in the case with LuRhO$_3$ cathode.

EXAMPLE 6

LaRhO$_3$ — TiO$_2$ Cell p-LaRhO$_3$ can also be used in place of LuRhO$_3$. This was demonstrated with a 0.2 M NaOH electrolyte in a cell identical to that used in FIG. 3.

p-LaRhO$_3$ was prepared by heating at 1350° C. under 3000 atm. for 10 hrs, a uniform mixture of 1.6864 gm La$_2$O$_3$ and 1.3136 gm Rh$_2$O$_3$ (1:1 La$_2$O$_3$ to Rh$_2$O$_3$) sealed under vacuum in a Pt tube. The resulting powder, which showed an X-ray pattern of perovskite LaRhO$_3$ with a minor phase of La$_2$O$_3$, was pelleted by heating at 1300° C. for 4 hr under 58 Kbar pressure in a Pt crucible. At room temperature, the pellet had a resistivity of 10 ohm-cm, a thermoelectric power of +30 $\mu$V° C., and an activation energy of resistivity of 0.14 eV. Electrode was made by attaching a copper wire to the pellet with silver paste which was then covered with an insulating epoxy resin.

On illuminating both the p-LaRhO$_3$ cathode and the n-TiO$_2$ anode with sunlight an open circuit potential of 18 mV and a short-circuit current of 9 $\mu$A (0.18 mA/cm$^2$ of LaRhO$_3$) were obtained. The current flow was from LaRhO$_3$ through the external circuit to TiO$_2$, and is apparently due to the cell reactions (1) and (2) above as in the case with LuRhO$_3$ cathode.

EXAMPLE 7

Rh$_2$O$_3$ — TiO$_2$ Cell p-Rh$_2$O$_3$ can also be used in place of LuRhO$_3$. This was demonstrated with a 0.2 M NaOH electrolyte in a cell identical to that used in FIG. 3.

The Rh$_2$O$_3$ electrode was made from a pellet formed by heating powdered Rh$_2$O$_3$ at 1100° C. for 4 hr under 30 Kbar pressure in a Pt crucible sealed in air. The pellet showed an X-ray pattern of the high pressure form of Rh$_2$O$_3$, a room temperature resistivity of 20 ohm-cm, an activation energy of resistivity of 0.16 eV, and a thermoelectric power of about +500 $\mu$V/° C. The electrode was fabricated as for LaRhO$_3$.

On illuminating both electrodes with concentrated sunlight, an open circuit voltage of 0.65 V, and a short circuit current of about 50 $\mu$A (0.33 mA/cm$^2$ were obtained. The amount of current can be increased by applying a bias voltage.

The gas collected by running the cell for 5$\frac{1}{2}$ hrs with 0.8 V applied voltage was analyzed to contain air and H$_2$.

We claim:
1. In a photoelectrochemical cell comprising an anode and a p-type semiconducting cathode the improvement wherein the said cathode comprises an oxide of trivalent rhodium.
2. A sunlight-permeable device for decomposing water into hydrogen and oxygen when filled with a sunlight-permeable aqueous electrolyte and exposed to sunlight comprising
a container permeable to sunlight
having within it an anode and a cathode so spaced that entering sunlight will impinge on both simultaneously,
the anode being a metallic conductor or an n-type semiconductor,
the cathode being a p-type semiconducting oxide of trivalent rhodium having a resistivity less than 10$^5$ ohm-cm, and an external electrical circuit connecting the anode and cathode, the said circuit containing an applied voltage of zero to 1.23 volts.

3. A device as in claim 2 wherein the cathode is a p-type semiconducting rhodate of the formula $Rh_2O_3$ or $ARhO_3$ wherein A is a trivalent rare earth.

4. A device as in claim 3 wherein the said rhodate is p-$Rh_2O_3$.

5. A device as in claim 3 wherein the said rhodate is $ARhO_3$, where A is a rare earth.

6. A device as in claim 3 wherein the said rhodate is p-$LuRhO_3$.

7. A device as in claim 3 wherein the said rhodate is p-$LaRhO_3$.

8. A device as in claim 3 wherein the said rhodate is p-$DyRhO_3$.

9. A device as in claim 2 wherein the anode is an n-type semiconductor whose anodic photopotential is more cathodic than $-0.3$ volt vs S.C.E.

10. A device as in claim 9 wherein the anode is n-$TiO_2$.

11. A device as in claim 2 wherein the anode is a metallic conductor.

12. A device as in claim 2 wherein the cathode is a p-type semiconducting rhodate of the formula $Rh_2O_3$ or $ARhO_3$ where A is a rare earth and the anode is an n-type semiconductor whose anodic photopotential is more cathodic than $-0.3$ volt vs S.C.E.

13. A device as in claim 12 wherein the cathode is p-$LuRhO_3$ and the anode is n-$TiO_2$.

14. A device as in claim 12 wherein the cathode is p-$LaRhO_3$ and the anode is n-$TiO_2$.

15. A device as in claim 12 wherein the cathode is p-$DyRhO_3$ and the anode is n-$TiO_2$.

16. A device as in claim 12 wherein the cathode is p-$Rh_2O_3$ and the anode is n-$TiO_2$.

17. In the process of photoelectrochemically hydrolyzing water wherein an anode and p-type semiconducting cathode are used the improvement wherein the said cathode comprises an oxide of trivalent rhodium.

18. In the process of claim 17 the improvement wherein the said cathode comprises p-$LuRhO_3$.

19. In the process of claim 17 the improvement wherein the said cathode is p-$LaRhO_3$.

20. In the process of claim 17 the improvement wherein the said cathode is p-$DyRhO_3$.

21. In the process of claim 17 the improvement wherein the said cathode is p-$Rh_2O_3$.

22. In the process of claim 17 the improvement wherein the anode is n-$TiO_2$ and the cathode is p-$LuRhO_3$.

23. In the process of claim 17 the improvement wherein the anode is n-$TiO_2$ and the cathode is p-$LaRhO_3$.

24. In the process of claim 17 the improvement wherein the anode is n-$TiO_2$ and the cathode is p-$DyRhO_3$.

25. In the process of claim 17 the improvement wherein the anode is n-$TiO_2$ and the cathode is p-$Rh_2O_3$.

* * * * *